March 1, 1960  S. G. HOFFMAN ET AL  2,926,358
METHOD FOR MAKING A HAT
Filed Oct. 18, 1956  3 Sheets-Sheet 3

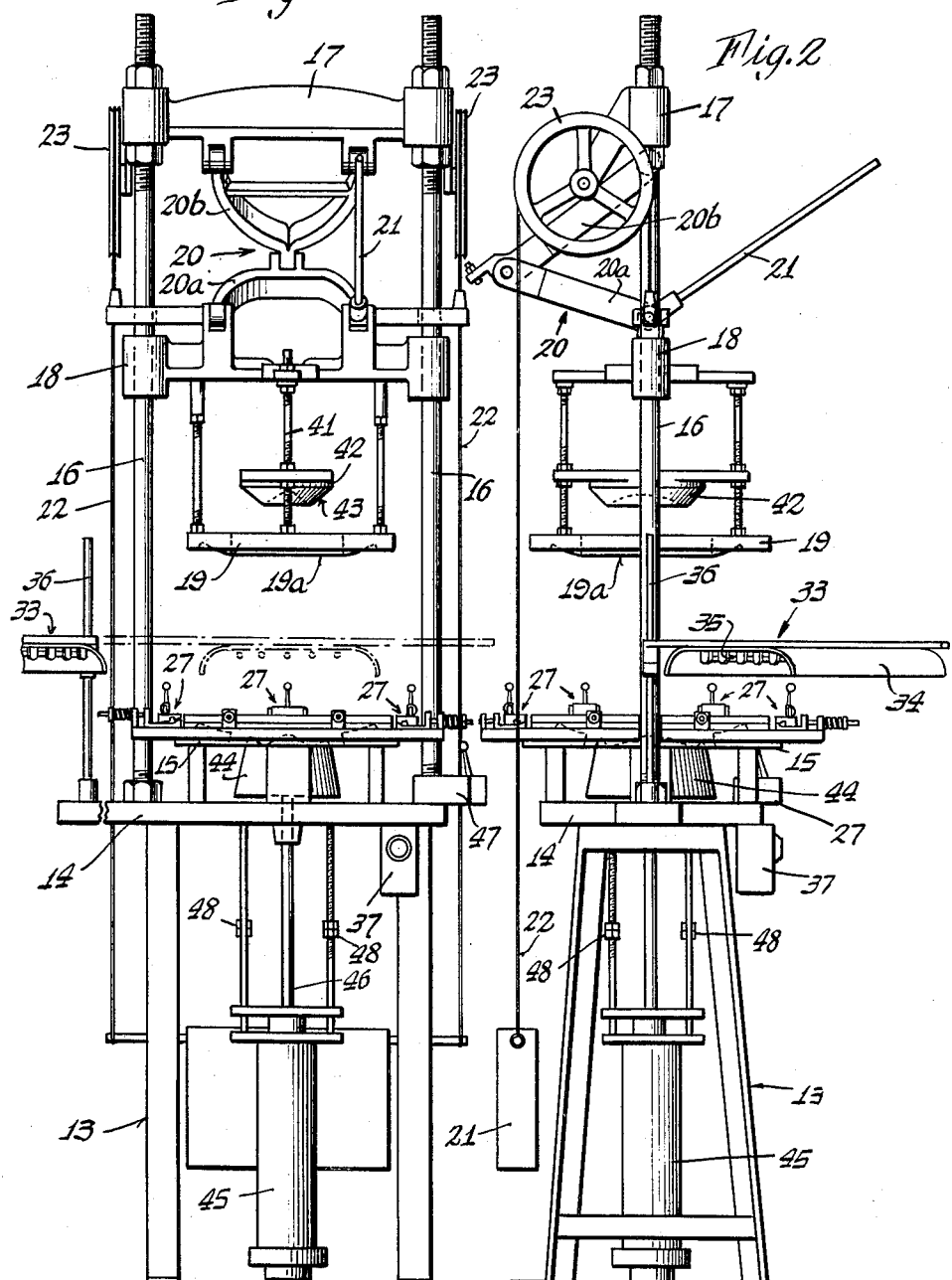

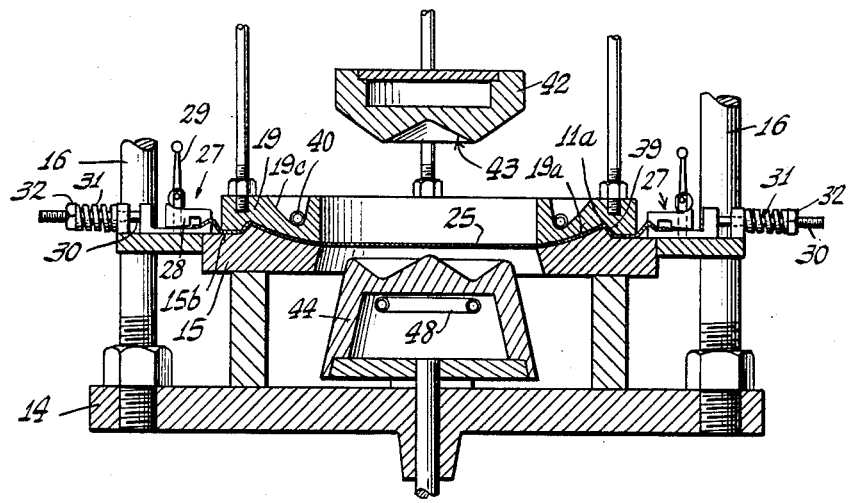
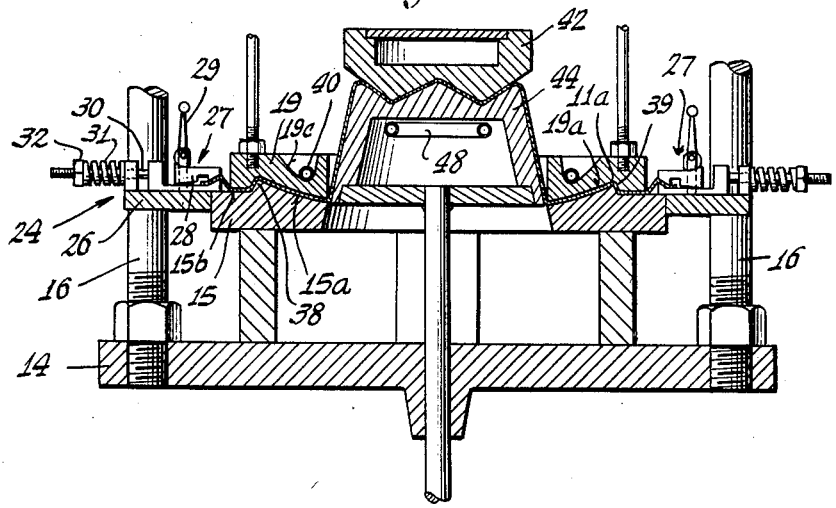

INVENTORS
Stanley G. Hoffman
Fred C. Van Ess
BY
Johnson and Kline
ATTORNEYS

United States Patent Office 2,926,358
Patented Mar. 1, 1960

2,926,358

METHOD FOR MAKING A HAT

Stanley G. Hoffman, Norwalk, and Fred C. Van Ess, Danbury, Conn., assignors to Hat Corporation of America, Norwalk, Conn., a corporation of Delaware Application October 18, 1956, Serial No. 616,691

3 Claims. (Cl. 2—193)

This invention relates to a hat particularly a hat of woven thermoplastic material having a relatively low melting point, and to the method and apparatus for making the same.

Heretofore, efforts to make hats from woven thermoplastic material have been unsuccessful since it is impossible to accurately control the shaping of the material to provide a hat having a satisfactory appearance or structure.

The present invention overcomes these difficulties by forming a hat having controlled porosity in the weave so as to provide a satisfactory brim and crown construction and by providing an apparatus and method whereby the hat can be made accurately and uniformly.

A feature of the present invention resides in the provision of means for heating the thermoplastic fabric in situ, controlling the shrinkage of the fabric during the softening period, progressively stretching the fabric, and quickly setting the fabric as it is molded.

Other features and advantages of the invention will be apparent from the specification and claims when considered in connection with the drawings in which:

Figure 1 is a front view of the machine.

Fig. 2 is a side view of the machine.

Fig. 3 is an enlarged transverse sectional view of the die members with the brim being molded.

Fig. 4 is a view similar to Fig. 3 with the crown being molded.

Figure 5:
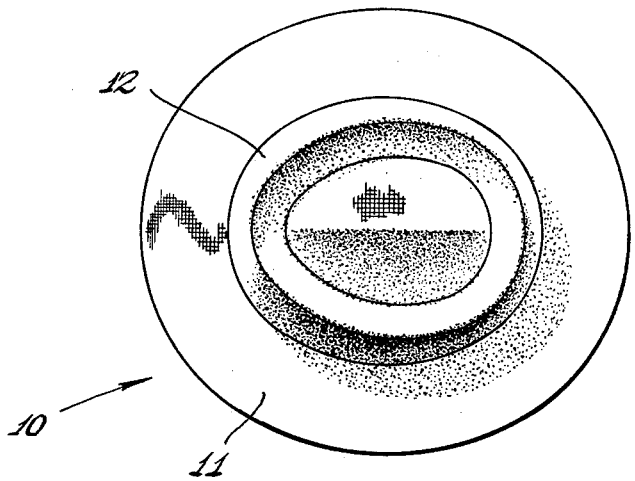
Fig. 5 is a top plan view of the hat of the present invention.
Figure 6:
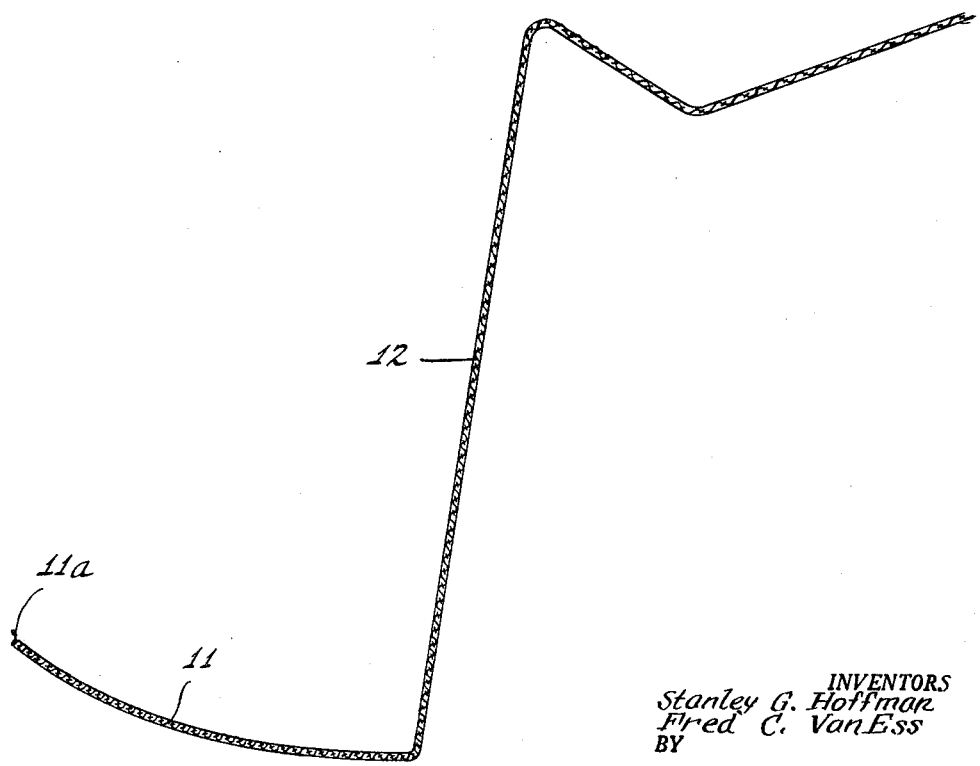
Fig. 6 is an enlarged detailed sectional view of the hat depicting the progressive controlled porosity of the hat from the edge of the brim to the center of the crown.

As shown in Figs. 5 and 6 of the present invention, the hat 10 has a brim portion 11 and a crown 12 and is formed from a molded woven thermoplastic material having a relatively low melting point so as to produce an imitation straw hat. It is at present preferred to utilize for the woven material copolymers of vinyl chloride and acrylonitrile having a softening and shrinking point of about 170° F. Such material is sold under the trade name Dynel. Other materials which may be used are fibers made from polymerization of vinylidene chloride which has a softening and shrinking point of 200° F., fibers made from polyvinyl alcohol polymers having a softening and shrinking point of about 160° F., fibers made from copolymers of vinyl chloride and vinyl acetate which soften and shrink at about 170° F. and fibers made from polyethylene (polymerization of ethylene) which soften at about 165° F.

Also, stretchable fabrics, such as knitted fabrics, in which the fibers are coated with resins can be utilized. The knitted fibers are of the type which are heat-resistant and normally not suitable for straw hat manufacture by this method and include acrylonitrile polymer; polyester, condensation polymer of ethylene glycol and terephthalic acid; polyamide fibers made from condensation polymers of hexamethylene diamine with adipic acid or sebacic acid; copolymers of acrylonitrile and vinyl acetate; regenerated cellulosic fibers; acetylated cellulose; zein; peanut; casein; silk; cotton and wool, which fibers are coated with resins which include polyvinyl alcohol—dissolve in acetone; aqueous polyvinyl alcohol emulsion; polyvinyl acetate—dissolve in acetone; aqueous emulsion of polyvinyl acetate; polyvinyl chloride—dissolve in methyl ethyl ketone; aqueous emulsion of polyvinyl chloride; copolymers of vinyl chloride and vinyl acetate—dissolve in acetone; aqueous emulsion of copolymers vinyl chloride and vinyl acetate; polyethylene—dissolve in xylene; and vinylidene chloride polymers—dissolve in tetramethylene oxide.

The above coating resins are those having a relatively low softening and shrinking temperature of between 160°–200° F. and having a molding temperature in the range of between 200°–300° F.

A feature of the hat resides in the fact that the fabric in the hat has its shrinkage controlled during the softening of the material and is given a predetermined progressive stretching from the brim to the crown so as to increase the porosity of the woven material as it extends from the brim to the center of the crown. This is illustrated in Fig. 5 by the spacing of the lines representing the woven fabric as they extend from the edge of the brim to the crown and in Fig. 6 by the gradual spreading of the section lines.

The hat of the present invention is provided by a novel method wherein a sheet of woven plastic material is heated to its softening point. During this heating the woven material also shrinks and its shrinkage is mechanically controlled. Thereafter, the sheet has its edges fixedly clamped in position over the fixed mold section and the mold is then closed so as to engage the fabric in a manner that the brim is progressively stretched from the edge toward the crown and the crown is progressively further stretched from the brim to the center of the crown.

While this method may be carried out by several different types of operations and molds, it is at present preferred to carry it out by means of the novel apparatus shown in Figs. 1 to 4 wherein a frame 13 is provided with a base 14 on which is mounted a lower, fixed, annular brim mold 15 having its surface 15a concaved to shape the undersurface of the brim. Extending above the base is a pair of posts 16 having their upper ends joined together by a crossbar 17. Slidably mounted on the posts is a carriage 18 having adjustably secured thereto an upper, movable, annular brim die 19 having molding surfaces 19a complementary to and cooperating with the surfaces 15a on the fixed brim die to mold the brim into its final shape. The carriage is connected by toggle mechanism 20 to the crossbar 17 and is provided with a handle 21 whereby upon downward movement of the handle the links 20a, 20b of the toggle mechanism are moved into aligned position and force the movable die 19 into molding engagement with the material disposed over the fixed die 15 to shape the brim of the hat. A counterweight 21 is connected to the carriage by a cable 22 extending over a pulley 23 carried by the crossbar 17 to normally maintain the carriage in raised position.

In accordance with the present invention a material carrier 24 is mounted on the base adjacent the edge of the fixed brim die to receive and hold a sheet 25 of woven plastic material in position thereover. While this may take many forms, it is herein illustrated as comprising a carrier frame 26 extending around the fixed die so as to support the material across the fixed die and in a position slightly spaced above the fixed die. The material is yieldably held on the carrier so as to control the shrinkage. While this may take the form of spring clips or weighting means, it is at present preferred to secure the sheet of fabric to the carrier by means of a plurality of clamps 27 having a cam-actuated jaw 28 adapted to be actuated by handles 29 to grip the edge portion of the sheet. The clamps are secured to the ends of rods 30 which are slidably mounted on the carrier and urged in the direction to stretch the fabric by springs 31 surrounding the rods 30, the tension of which can be adjusted by nuts 32 threaded on the ends of the rods.

In accordance with the present preferred form of the invention the fabric is heated to soften and shrink it after it is mounted on the carrier as this eliminates the handling of the softened fabric and enables a more accurate control of the fabric.

This is accomplished by mounting a heating unit 33 on the base for movement from a retracted position to a position over the supported fabric. While the heating unit may take the form of a hot plate or other suitable heating device, in the herein illustrated form of the invention it comprises a reflector unit 34 having a plurality of elongate infrared tubes 35 mounted therein. The reflector unit is pivotally mounted on a supporting rod 36 for movement from a retracted position, as shown in full lines in Fig. 1, to the operative position as shown in dot and dash lines wherein it overlies the sheet so as to uniformly heat the material mounted on the carrier. A temperature control and timer 37 is connected to the heater and accurately controls the softening of the material.

As the material softens, it shrinks and the present invention accurately controls this shrinkage by properly adjusting the tension on the springs 31. As soon as the sheet is heated to a softening point, the heating device is moved out of the way and the carriage having a movable die is moved into molding position.

It will be noted in Figs. 3 and 4 that the fixed die has a cut-away portion 15b adjacent the edge, leaving a ridge 38 around the brim portion and the movable die has a cooperating groove 39 therein which enables the material adjacent the edge of the brim to be clamped to the fixed die. Subsequent movement of the movable die will cause the material to be progressively stretched inwardly from the edge. Preferably, the fixed die is an unheated die while the movable die is heated by means of a calrod unit or the like heating device 40 nested in the recessed upper surfaces 19e thereof. As the plastic sheet is engaged by the heated die and stretched it will be moved into engagement with the cooler lower die and will set the fabric in its progressively stretched condition.

The carriage for the movable die also has adjustably fixed thereon by means of the threaded posts 41, an outer crown die member 42 which is adapted to be positioned over the center of the sheet and has on its undersurface the die formation 43 for molding the top of the crown. When the movable brim die is moved into position, it automatically locates the top of the crown by positioning the outer crown die as shown in Fig. 3.

Disposed below the fixed die and located under the center of the sheet is normally retracted inner crown die 44 which is adapted to be moved upwardly through the center of the brim dies and into engagement with the portion of the sheet extending therefrom and to move said portion upwardly and into engagement with the fixed crown die to form the crown portion of the hat. While manual or mechanical means for moving the inner die upwardly through the center of the annular brim dies to form the crown may be employed, it is herein illustrated as fluid pressure actuated means comprising a cylinder 45 mounted on the base and having a piston 46 connected to the inner crown die which cylinder and piston are actuated by fluid controlled by a manually operated valve 47. Adjustable stops 48 control movement of the die in molding engagement with the fixed crown die 42. It will be seen that as this inner die, which is heated by heater 48, moves upwardly it will engage and progressively stretch the center portion of the sheet forming crown from the edge of the crown, where it is gripped by the closed brim dies, toward the center of the crown and progressively increase its porosity. As the inner die completes its stroke it will effectively clamp the center of the crown against the outer unheated crown die and this will fix the thermoplastic crown configuration in its molded shape. As soon as the crown is molded, the handle 21 is reversed and die sections are separated, the clamps 27 released, and the molded hat removed. The hat is then trimmed around the edge 11a of the brim by means of any suitable cutting tool and is then ready for finishing by having the usual sweatband and other ornamentation (not shown) applied thereto.

Variations and modifications may be made within the scope of the claims and portions of the improvements may be used without others.

We claim:

1. The method of making straw-type hats having a brim and crown from thermoplastic material having a relatively low softening point comprising the steps of gripping the edges of a sheet of woven thermoplastic material having a softening point of between 160°–200° F. in yieldably and adjustably mounted gripping means, tensioning said sheet by the said yieldably and adjustably mounted gripping means, supporting the sheet between cooperating fixed unheated die means and heated movable die means, heating said sheet to a temperature within the range of 160°–200° F. to soften and shrink the sheet, controlling shrinkage by the said yieldably and adjustably mounted gipping means, moving the movable die means against said sheet to stretch said sheet and place said sheet into engagement with the unheated die means, progressively stretching said sheet and increasing the porosity of the woven thermoplastic material from the edge of the brim to the center of the crown, setting the stretched sheet in molded form, and cooling the molded form to maintain the set.

2. The method of making straw-type hats having a brim and crown from thermoplastic material having a relatively low softening point comprising the steps of gripping the edges of a sheet of woven thermoplastic material having a softening point of between 160°–200° F. with yieldable gripping means, tensioning said sheet by the yieldable gripping means, heating said sheet to a temperature between 160°–200° F. to soften and shrink the sheet, controlling the shrinkage by the yieldable gripping means, clamping the softened sheet to a fixed mold adjacent the edge of the brim, moving movable mold means against said sheet to stretch and mold said sheet, and cooling the stretched molded form.

3. The method of making straw-type hats having a brim and crown from thermoplastic material having a relatively low softening point comprising the steps of: gripping the edges of a sheet of woven thermoplastic material having a softening point of between 160°–200° F. in yieldable gripping means, heating said gripped sheet to a temperature in the range of 160°–200° F. to soften and shrink the sheet, tensioning said sheet by the gripping means to control shrinkage, molding the sheet by clamping the said sheet securely at its outer portions to a die, and moving molding means against the sheet, stretching said sheet with the molding means, forming a brim portion and a crown portion, progressively increasing the porosity of the woven thermoplastic material from the brim to the crown, and cooling to permit the molded sheet to set.

References Cited in the file of this patent

UNITED STATES PATENTS

| 1,053,669 | Stevens | Feb. 18, 1913 |
| 2,010,285 | Wiedeman | Aug. 6, 1935 |
| 2,026,392 | Langella | Dec. 31, 1935 |
| 2,049,986 | Wiedeman | Aug. 4, 1936 |
| 2,185,306 | Marks | Jan. 2, 1940 |
| 2,616,091 | Luttge | Nov. 4, 1952 |
| 2,713,443 | Contrell et al. | July 19, 1955 |
| 2,776,435 | Trimpert | Jan. 8, 1957 |